June 2, 1959　　　M. C. PATRICK　　　2,888,770
DEEP SEA FISHING DEVICE
Filed Feb. 8, 1954　　　　　　　　　　　2 Sheets-Sheet 1
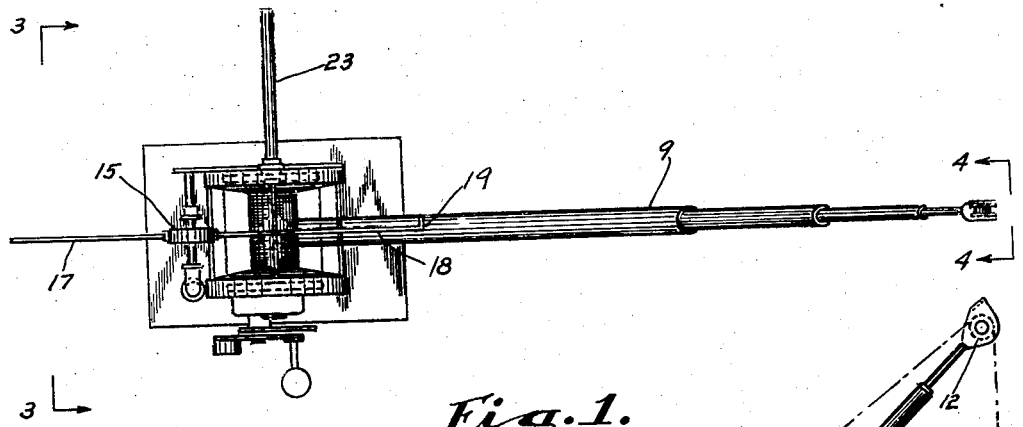
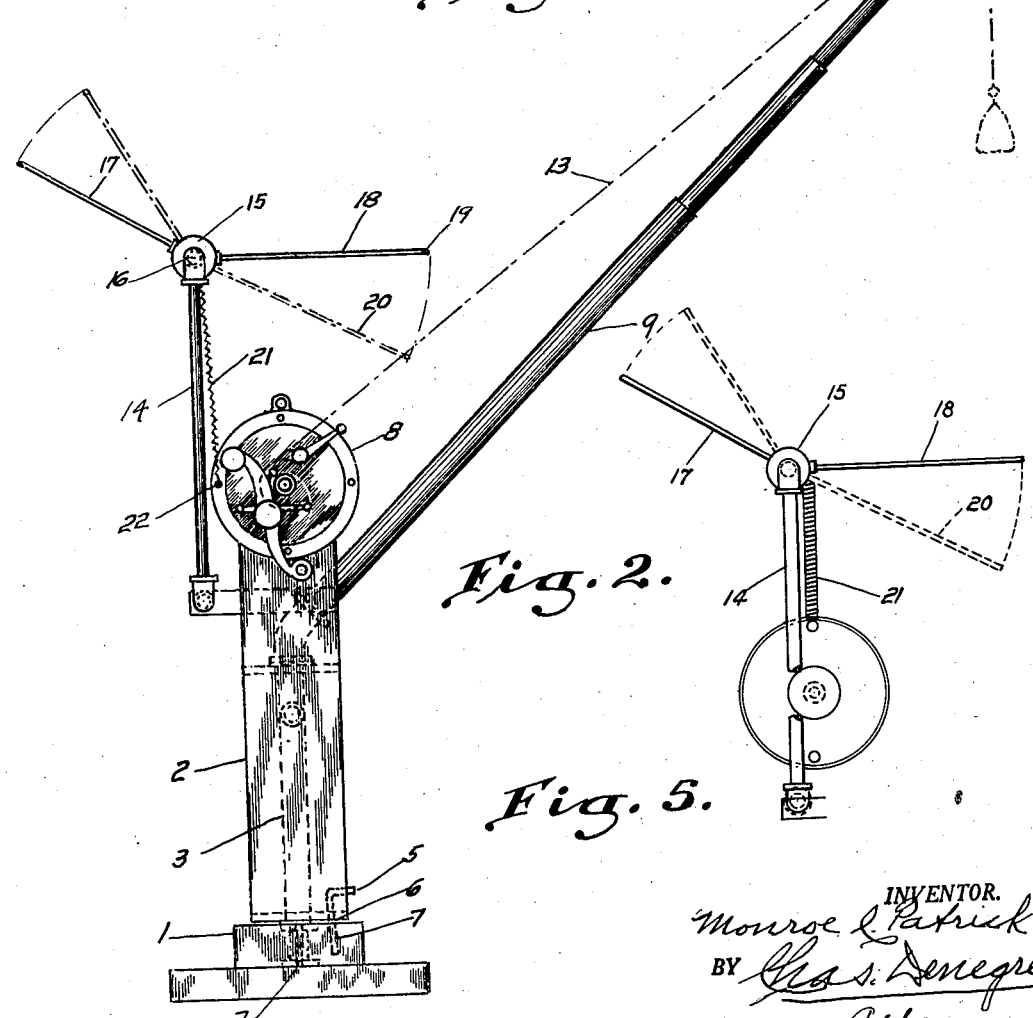
INVENTOR.
Monroe C. Patrick
BY Chas. J. Denegre
Attorney

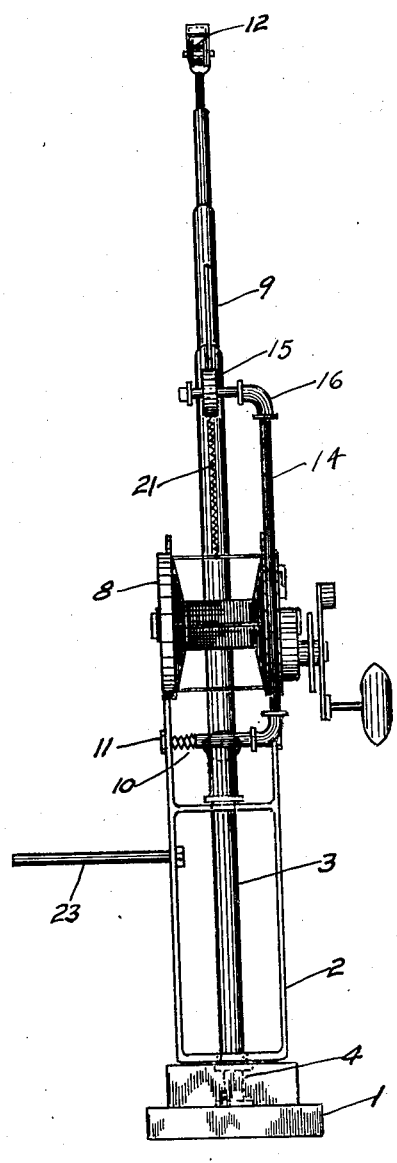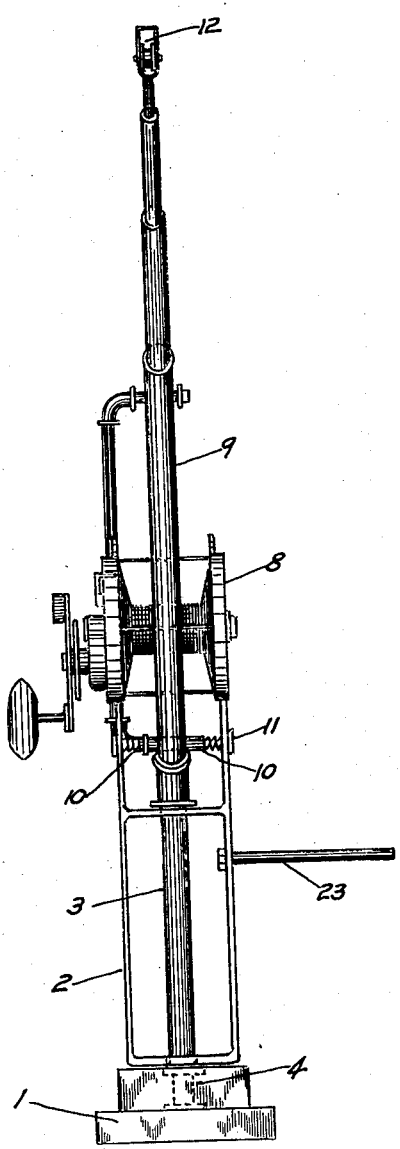

2,888,770
DEEP SEA FISHING DEVICE
Monroe C. Patrick, Birmingham, Ala.

Application February 8, 1954, Serial No. 408,754

1 Claim. (Cl. 43—4)

This invention relates to a deep sea fishing device. It has for its main objects to provide such a device that will be highly satisfactory for the purpose intended, simple in structure, cheap to manufacture, easy to use and keep in working condition, and extremely durable.

A further object is to provide such a device that will be adapted for removable attachment to the rail of what is generally known as a deep sea fishing boat.

Other objects and advantages will appear from the drawing and description.

By referring generally to the drawings, a part of this application, it will be observed that Fig. 1 is a top plan view of a device made according to the present invention; Fig. 2 is a side elevational view with a fishing line shown in broken lines; Fig. 3 is a view on line 3—3 of Fig. 1; Fig. 4 is a view substantially on line 4—4 of Fig. 1; and Fig. 5 is a detail enlarged view showing the spring and how it is attached to some of the other parts.

Similar reference numerals refer to similar parts throughout the several views.

Referring to the drawings in detail it will be seen that the device comprises a main base 1 adapted for being clamped upon the rail of what is generally known as a large size deep sea fishing boat. A supporting bracket 2 with a perpendicular shaft 3 is mounted revolvably on the base with lower end of the shaft 3 in a bearing 4. To prevent the bracket from being revolved a pin 5 is removably inserted through a hole 6 in the bottom of the bracket and into a registering hole 7 in the base. A regular fishing reel assembly 8 is mounted in the top of the bracket. An arm 9 extends from the bracket and is maintained in a center position by adjusting set screws 10 that are supported in the bracket as at 11. A small pulley 12 is mounted in the outer end of the arm for the fishing line 13 to pass over. A vertically extending arm 14 is attached to the bracket for supporting a disc 15 on a shaft and bearing 16. Two small arms 17 and 18 extend from the disc for movement by manual means to test any pull on the line by having the end 19 make contact with the line. A bent end 19 is formed integral with the arm 18 and is adapted for contact removably with the fishing line as indicated by broken lines 20 in Fig. 2. A small coil spring 21 with its upper end attached to the bottom of the disc and its lower end attached to the reel assembly as at 22 is set in tension to retain the arm 18 in a substantially horizontal position as shown in Fig. 2.

From the foregoing it will appear that to use the device it is revolvably attached to the flat top of a rail as used on deep sea fishing boats. The feeler arms 17 and 18 are used by the fisherman by the bent end 19 being placed under the fishing line and the other end manually controlled by a hand of the fisherman. When a fish is caught and pulled up to the outer end of arm 9, the retaining pin 5 is released and the assembly is revolved by the handle 23 so as to swing the fish over the boat rail and into the boat.

The various parts of the device may be made of any material suitable for the purpose, but I prefer to use a standard fishing reel assembly, and metal and wood for the attaching and supporting parts. Also the device may be made in different sizes and capacities, depending on how and where to be used.

While I have shown and described the preferred embodiment of my invention, I do not wish to limit the same to the exact and precise details of structure, but reserve the right to make all modifications and changes so long as they remain within the scope of the invention and the following claim.

Having described my invention I claim:

A deep sea fishing device of the character described comprising a supporting base adapted for removable attachment to a flat surface, a bracket including a pair of spaced sides which extend upwardly and a shaft in the bracket, the bottom end of the shaft extending through the bottom of the bracket, said mounting means including a bearing mounted in the base, the lower end of the shaft being attached revolvably in said bearing, a fishing line reel mounted in the upper part of the bracket, an arm extending outwardly from the bracket from a point under said reel, a small pulley in the outer end of said extending arm, said pulley being adapted for a fishing line to travel thereon, an arm secured to and extending upwardly from the rear of said bracket, a second shaft mounted on said last named arm, a disc supported by said second shaft, a bearing for said second shaft, a pair of arms attached in said disc, one of said pair of arms being adapted for use as a handle, the other arm of said pair having an integral bent end adapted for making contact with a fishing line extending from the said reel and over the said pulley; said bracket having a handle for manually turning the bracket on the base and for retaining the bracket and parts thereon in different positions; set screws mounted through the sides of said bracket and adapted to retain the arm with the pulley thereon in its center position relative to said bracket wherein it extends outwardly from the reel; a coil spring attached to the lower edge of the disc and the edge of the reel and set in tension to rotate said disc so as to move said arm toward the reel to thus rockably hold one of the arms attached to the disc in a substantially horizontal position.

References Cited in the file of this patent

UNITED STATES PATENTS

| | | |
|---|---|---|
| 374,737 | Geils | Dec. 13, 1887 |
| 1,253,746 | Teeling | Jan. 15, 1918 |
| 1,957,853 | Sibley | May 8, 1934 |
| 2,530,864 | Easterday | Nov. 21, 1950 |
| 2,664,661 | Kohn | Jan. 5, 1954 |